United States Patent
Kolbenschlag et al.

(10) Patent No.: US 10,724,651 B2
(45) Date of Patent: Jul. 28, 2020

(54) ELECTROPNEUMATIC MAGNET VALVE, FLAPPER VALVE MEMBER FOR AN ELECTROPNEUMATIC MAGNET VALVE

(71) Applicant: SAMSON AKTIENGESELLSCHAFT, Frankfurt (DE)

(72) Inventors: Stefan Kolbenschlag, Darmstadt (DE); Michael Pittelkow, Seligenstadt (DE)

(73) Assignee: SAMSON AKTIENGESELLSCHAFT, Frankfurt (DE)

(*) Notice: Subject to any disclaimer, the term of this patent is extended or adjusted under 35 U.S.C. 154(b) by 0 days.

(21) Appl. No.: 15/482,127

(22) Filed: Apr. 7, 2017

(65) Prior Publication Data
US 2017/0292627 A1 Oct. 12, 2017

(30) Foreign Application Priority Data
Apr. 7, 2016 (DE) .......... 10 2016 106 410

(51) Int. Cl.
*F16K 31/42* (2006.01)
*F16K 31/06* (2006.01)
(Continued)

(52) U.S. Cl.
CPC ........ *F16K 31/423* (2013.01); *F15B 13/0438* (2013.01); *F16K 31/0606* (2013.01);
(Continued)

(58) Field of Classification Search
CPC ............. F16K 31/423; Y10T 137/8667; Y10T 137/86678; Y10T 137/86686
(Continued)

(56) References Cited

U.S. PATENT DOCUMENTS 3,921,670 A * 11/1975 Clippard, Jr. ....... F16K 31/0606
137/625.27
4,196,751 A * 4/1980 Fischer ............... F16K 31/0606
137/625.65
(Continued)

FOREIGN PATENT DOCUMENTS

DE 90 17 107 U1 4/1992
DE 19636207 A1 8/2000
(Continued)

*Primary Examiner* — Jessica Cahill
*Assistant Examiner* — Patrick C Williams
(74) *Attorney, Agent, or Firm* — Schiff Hardin LLP

(57) ABSTRACT

An electropneumatic solenoid valve for a pneumatically-actuated field device can include air channels, a flapper valve member, an electromagnetic controller, and a spring. An air supply channel, air dispensing channel and air exhaust channel can be mound into an air chamber. The flapper valve member can include a closure element arranged on an axial control direction and be engageable with a delimitation interior wall mouth of one of the air channels such that the flapper valve member is arranged with a circumferential axial distance to the delimitation interior wall. The electromagnetic controller can displace the flapper valve member in the axial control direction to ventilate/exhaust the air dispensing channel. The spring can bias the flapper valve member into a closed position to close closing the one of the air channels. The flapper valve member can be float-mounted in an unguided configuration except for spring within the air chamber.

15 Claims, 3 Drawing Sheets

(51) Int. Cl.
*F16K 31/08* (2006.01)
*F15B 13/043* (2006.01)
*F15B 13/04* (2006.01)

(52) U.S. Cl.
CPC ........ *F16K 31/0631* (2013.01); *F16K 31/086* (2013.01); *F15B 13/0405* (2013.01)

(58) Field of Classification Search
USPC ...................................... 137/625.25–625.27
See application file for complete search history.

(56) References Cited

U.S. PATENT DOCUMENTS

| | | | | |
|---|---|---|---|---|
| 4,336,823 A | * | 6/1982 | Staiger | F16K 31/0606 137/270 |
| 4,705,073 A | * | 11/1987 | Beck | A61M 1/0043 128/205.19 |
| 5,617,894 A | * | 4/1997 | Wolff | F16K 31/0631 137/625.5 |
| 8,684,036 B1 | * | 4/2014 | Satoda | F16K 27/029 137/625.33 |
| 8,690,118 B2 | * | 4/2014 | Bunni | F02M 47/027 239/585.3 |
| 2002/0079007 A1 | * | 6/2002 | Entwistle | F16K 31/0665 137/625.65 |
| 2002/0135451 A1 | | 9/2002 | Frank et al. | |
| 2004/0261850 A1 | | 12/2004 | Maula et al. | |
| 2005/0115618 A1 | | 6/2005 | Kumar | |

FOREIGN PATENT DOCUMENTS

| | | |
|---|---|---|
| DE | 101 13 316 A1 | 9/2002 |
| DE | 11 2004 001 147 T5 | 6/2006 |

* cited by examiner

ELECTROPNEUMATIC MAGNET VALVE, FLAPPER VALVE MEMBER FOR AN ELECTROPNEUMATIC MAGNET VALVE

CROSS REFERENCE TO RELATED APPLICATIONS

This patent application claims priority to German Patent Application No. 102016106410.6, filed Apr. 7, 2016, which is incorporated herein by reference in its entirety.

BACKGROUND

The present disclosure relates to an electropneumatic solenoid valve or magnet valve for a pneumatically actuated field device (e.g., a positioner), such as a position controller, of a processing plant, such as a chemical plant, a petrochemical plant, a food processing plant (e.g., a brewery), a power plant (e.g., nuclear, coal, natural gas, etc.) or the like.

A generic electropneumatic magnet valve has a housing structure in which usually an air supply channel for connection to a source of pressurized air, an air dispensing channel, and an air exhaust channel are formed. A flapper valve member, such as a flapper plate, is movably mounted within an air chamber. An electropneumatic control device positions or displaces the flapper valve member between two operation positions, in which one of the air canals, respectively, is closed. The flapper valve member is can be moved in an axial control direction. Furthermore, the magnet valve includes a biasing means, such as a spring, which urges the flapper valve member in the axial control direction into a closed position for closing one of the air channels. The flapper valve member has a magnetic flapper plate which is float-mounted inside the air chamber guiding-free except for the biasing means.

An example electropneumatic magnet valve having a flapper plate as a flapper valve member is described in German Patent document DE 196 36 207 C2. The magnet valve requires a precise manufacturing, and more so when a precise closure of the respective air channel shall be achieved with low energy consumption.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
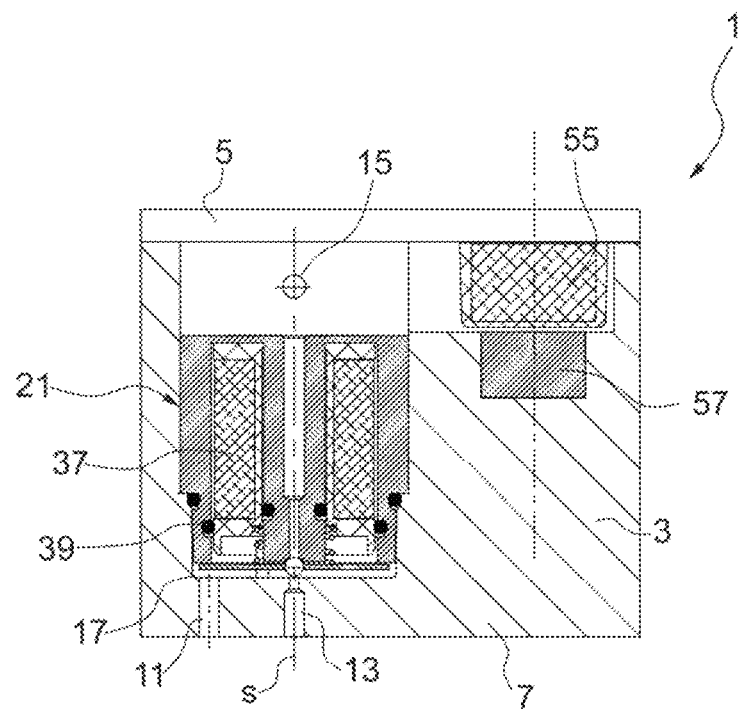
FIG. 1 illustrates a cross sectional view of an electropneumatic solenoid valve according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an objective of the disclosure to overcome the disadvantages of the related art, in particular, to improve an electropneumatic solenoid valve or magnet valve for a pneumatically actuated field device. For example, an object of the disclosure is to provide a precise working function of the electropneumatic magnet valve of simple design even given different operating conditions.

In an exemplary embodiment, an electropneumatic solenoid valve or magnet valve is provided for a pneumatically actuated field device, in particular a positioner, position controller or final control device, of a processing plant. A processing plant can include, for example, a chemical plant, a petrochemical plant, a food processing plant (e.g., a brewery), a power plant or the like. In an exemplary embodiment, the magnet valve has an air supply channel, in particular, for attachment to a source of pressurized air (e.g., constant 6 bar). A controlled air signal from, for example, an electropneumatic position controller can also be attached to the air supply channel. In an exemplary embodiment, the magnet valve has an air dispensing channel for connecting to, for example, a pneumatic positioning drive, which can be of the single-action or a double-action type. In particular, considering emergency shut down operations, the magnet valve can additionally comprise an air exhaust channel. The magnet valve defines, partially through its housing structure, an air chamber, into which the air channels mound. In an exemplary embodiment, the air chamber is delimited except for the interior housing structure of the magnet valve, also by structures which are to be magnetized, the particularly axial bore surfaces thereof, which may for example be a coil core or coil coat. In an exemplary embodiment, one of the air channels, such as the air exhaust channel, is formed within the coil core. For releasing and for closing each respective air channel, the electropneumatic magnet valve according to an exemplary embodiment comprises a flapper valve member, such as a magnetisable flapper plate and an electromagnetic control device. In an exemplary embodiment, the flapper plate defines mutually parallel plane plate sides. The electromagnetic control device can be configured to displace the flapper valve member in an axial control direction for ventilating and/or exhausting the air dispensing channel. In an exemplary embodiment, the electromagnetic control device is formed by a coil to be supplied with electricity, the coil radially surrounding the coil core of metal, and having, for the formation of a closed magnetic circuit, a coil core radially surrounding the coil.

In an exemplary embodiment, the magnet valve has an additional (mechanical) biasing means, such as a pressure spring, and/or a magnetic biasing means configured to urge the flapper valve member in the control direction into a closed position for closing one of the air channels. In an exemplary embodiment, the electromagnetic control device is configured to move the flapper valve member between two operating positions. A closing positions is where on one side the air supply conduit or air dispensing channel and on the other side the air exhaust channel is sealed in an air tight manner by the flapper valve member. In an exemplary embodiment, the flapper valve member has a closure element particularly being arranged on the control direction axis, the closure element coming into engagement for closing one of the air channels in particular with a delimitation mounding edge of the respective air channel such that the flapper valve member is arranged and held in a circumferential axial distance, in particular in a constant circumferential annular distance, towards the axially adjacent delimitation interior wall of the air chamber such that the flapper valve member remains non-displaceable (or stationary) in the radial direction even in case of radial impacts. In an exemplary embodiment, the flapper valve member sealingly engages exclusively with the delimitation mounding edge for providing for a safe and air-tight closing of the air channel. A further contact to the delimitation interior wall is excluded by the circumferential axial distance.

In an exemplary embodiment, the circumferential axial distance (or circumferential distance in the axial direction), occurs when the flapper valve member is arranged in a perpendicular or orthogonal orientation relative to the control direction axis. Thereby, in an exemplary embodiment, the flapper valve member is dimensioned in relation to the mounding edge of the air channel to be closed such that an involuntary orientation of the flapper valve member is caused during its movement into the closing position in particular under the influence of the electromagnetic forces and/or of the biasing means. In an exemplary embodiment, the air channel to be closed and the mounding edge thereof in the air chamber delimitation wall are realized as a valve seat bore. The flapper valve member, the seat bore, in particular opposing seat bores, and in particular, an axial maximal stroke of the flapper valve member in the air chamber are dimensioned/realized such that the flapper valve member is held, in particular, in the area of the seat bores, through the delimitation edge of the housing structure, a core structure of the electromagnetic control device and upon operation, and closing particularly involuntarily centres itself centrally in the seat bore. During the passive or non-actuated operation, the bore edges of the seat bore form the holding structure against which the flapper valve member meets in order to be held in the radial direction. During operating/closing of the in particular spherical flapper valve member, this automatic centering occurs.

In an exemplary embodiment, in another dimensioning of the valve system, it may, due to the float-mounted mounting of the flapper valve member, the flapper valve member may come into an axial contact with the delimitation interior wall of the air chamber in an angled position relative to the control direction axis. This may go along with an exceptional operating condition, such as an impact load onto the magnet valve, which may be only at a small area of contact which, however, does not impair the air tight sealing of the air channel. In an exemplary embodiment, the flapper plate can be dimensioned and structured relative to the particular plane delimitation interior wall of the air chambers such that a constant circumferential distance in the axial direction towards the delimitation interior wall is set when the plate-shaped flapper valve member is oriented in a desired or vertical orientation relative to the direction axial of the electromagnetic control device.

In an exemplary embodiment, the flapper plate is arranged in the air chamber such that a radial contact of the flapper plate to the delimitation wall of the air chamber is avoided. In an exemplary embodiment, a radial contact is to be avoided insofar as an increased amount of friction, which would go along with such a contact, would be negative in view of the functional operation. In an exemplary embodiment, the radial distance between the flapper plate and the delimitation wall of the air chamber is to be chosen (e.g., to be dimensioned) such that no (or little) radial touch or engagement can occur during normal operation of the operator. In an exemplary embodiment, the magnetic flapper plate can be float-mounted for normal operation such that, in the opening condition thereof, the flapper plate exclusively stands in an engaging contact with the biasing means (e.g., spring), and in the closed condition thereof, the flapper plate exclusively stands in an engaging contact on one side with the biasing means and on the other side with a valve seat or the like.

In an exemplary embodiment, the flapper valve member (e.g., the magnetic flapper plate) is arranged in the air chamber without any further guiding means such that a contact of the flapper valve member with the delimitation wall sections of the air chamber exclusively occurs in the centering area of the flapper valve member. In an exemplary embodiment, contacts of the flapper member, in particular of the flapper plate, shall be excluded. In an exemplary embodiment, the omission of any further guidance means, such as guiding pins, results in a significant reduction of assembly work, wherein it has surprisingly been shown that the operability of the float-mounted flapper valve is not impaired.

In an exemplary embodiment, the closure element is formed as a protrusion that projects on both sided from the plane flapper valve member. In an exemplary embodiment, the protrusion is at least partially convex spherically shaped. In an exemplary embodiment, the closure element is arranged/formed in the axial center of an in particular circular flapper plate of the flapper valve member. In an exemplary embodiment, the closing element is formed as a circular ball mounted separately in the flapper plate and/or made of a non-magnetic material such as ceramics. In an exemplary embodiment, the separately mounted ball consists exclusively of the non-magnetic material. This way, the magnetic flow is not steered in the direction of the closure element but deflected therefrom such that the magnetic flow is diverted because of the non-magnetic closure element material. A magnetic sticking/attraction of the ball due to residue magnetism between the ball and the seat is thus avoided.

In an exemplary embodiment, the flapper valve member has a radially inner interior stop section diametrically opposite from the coil core of the electromagnetic control device, and an outer end stop section radially outward surrounding the inner end stop section and the outer end stop section lying diametrically opposite to a coil coat of the electromagnetic control device radially outwardly surrounding the coil of the electromagnetic control device or diametrically opposite to a housing section of the magnet valve. In an exemplary embodiment, the outer end stop section does not necessarily need to serve the function of stopping or touching, however, should the float-mounting of the flapper plate, for instance due to a momentarily tilted position in the case of assembly or due to an impact load, be moved away from its usual displacement-position and -direction, an extraordinary outward stop or inward stop is made possible to provide for a short term tilting with limited tilting amplitude. It is the cooperation of the electromagnetic force of the electromagnetic control device and/or of the biasing means in relation to the embodiment of the closure element of the flapper valve member in conjunction with the mounding edge of the channel to be closed, which provides for the alignment/holding of the flapper plate for forming the contact-free axial distance to the delimitation wall.

In an exemplary embodiment, one of the air channels, such as the air exhaust channel, is formed in the coil core. With the air channel in the coil core, with which the closure section shall cooperate in a tightly sealing manner, it is of advantage that non-magnetic material is provided for the closure element.

In an exemplary embodiment, the flapper plate and the corresponding end stop sections are configured, structured and/or dimensioned such that, during sealing occupation of the air channel in the coil core by the closure element of the flapper valve member, the radially outer axial distance of the flapper valve member to the outer end stop section is smaller than the inner axial distance of the flapper valve member to the inner end stop section. In an exemplary embodiment, the radially inner axial distance is, during occupation of the air channel with the coil core by the closure element, smaller than, for example, 0.5 mm, 0.3 mm or 0.1 mm, but is not limited thereto. In an exemplary embodiment, additionally or alternatively, the radially outer axial distance is at least one third or at least one half smaller than the radially inner axial distance. This way, it is ascertained that the tilting amplitude of the float-mounted flapper valve member is limited particularly through the outwardly lying end stop.

In an exemplary embodiment, a further air channel, such as an air supply channel or air dispensing channel, is inserted into the housing wall of the magnet valve coaxially to the air channel, particularly air exhaust channel, in the coil core. The further air channel can be inserted such that the backside of the closure element, the front side of which closes the air channel in the coil core, upon corresponding axial displacement of the flapper valve member under influence of the biasing mean, closes the air channel in the magnet valve housing wall. The further air channel can be formed radially offset to the air channel in the magnet valve housing wall, such as the air dispensing channel or air supply channel, which in particular is not closeable by the flapper valve member in any axial control position thereof. The radially offset air channel is in no axial control position of the flapper valve member closeable by the flapper valve member.

In an exemplary embodiment, the air chamber is radially limited by an essentially cylindrical chamber interior wall which is at least partially formed by the magnet valve housing. The air chamber can be axially limited by an adjacent housing wall in which at least two air channels are inserted and which lies opposite from the magnetisable component of the electromagnetic control device. In an exemplary embodiment, it is this magnetic structure of the electromagnetic control device which limits the air chamber on the opposite axial side. In the cylindrical air chamber, the annular flapper plate of the flapper valve member, in particular being of constant flapper plate thickness, can be float-mounted axially movable and in particular like a piston. In an exemplary embodiment, the flapper valve member is exclusively mechanically guided by the biasing means. In an exemplary embodiment, the axial, maximal movement amplitude of the flapper valve member in the axial control direction is as most one tenth to one quarter of the particularly constant axial strength of the flapper plate (the thickness of the flapper plate can lie between, for example, 0.6 mm and 1 mm and the stroke between 0.1 mm and 0.3 mm). In this way, a good air exchange between the two air chamber compartments separated by the flapper valve is provided. In an exemplary embodiment, the flapper plate serves to close each individual air channel and moves axially between the axially opposite limitation walls of the air chamber in which the in particular axially opposite air channels are arranged.

In an exemplary embodiment, the axial, particularly maximal, amplitude of movement of the flapper valve member in the axial direction is at least $1/10$, at least $1/8$, or at least $1/4$ of the cross sectional diameter of the nozzle diameter and/or at most $9/10$, at most $2/3$, at most $1/2$ of the nozzle diameter. In an exemplary embodiment, the stroke, i.e. the amplitude of movement, amounts to between 0.1 mm and 1.5 mm or between 0.2 mm and 0.6 mm. In an exemplary embodiment, the stroke is 0.4 mm. The present disclosure is not limited to these example values. In an exemplary embodiment, the thickness of the flapper plate (cross section) has a thickness such that even in case of a maximum supply of the magnet core with electric current; the flapper plate does not achieve the magnetic saturation. In an exemplary embodiment, the flapper plate has a thickness of less than 2 mm, or less than 1 mm. In an exemplary embodiment, the flapper plate has a thickness less than 0.5 mm, but is not limited thereto. These thickness keep the mass of the flapper plate small.

A flapper valve member for arrangement within an air chamber of an electropneumatic solenoid valve or magnet valve is described herein. In an exemplary embodiment, the flapper valve member includes a flapper plate and possibly the aforementioned closure element. In an exemplary embodiment, the flapper plate has an axial closure side, and in some embodiments, two diametrically opposite axial closure sides, which are to face at least one air channel to be closed or to be released. The closure side(s) can at least surface-sectionally come into engagement contact with an axial contact wall of the air chamber to be magnetised by the electromagnetic control device of the magnet valve.

In the contact wall, the at least one air channel can be formed. In an exemplary embodiment, the at least one closure outside (e.g., both axially diametrically arranged closures outside) is at least surface-sectionally provided with a non-magnetizable material such as, for example, Teflon. In an exemplary embodiment, the surface is provided with a non-magnetizable cover layer, such as a Teflon layer. According to the disclosure it is achieved that a magnetic sticking/attraction even after the deactivation of the electromagnetic control device, in particular to the magnetized component of the electromagnetic control device such as a coil core and/or the coat, is avoided. The stickage-avoidance-effect is thus realized by means of a material which is not magnetizable (e.g., cannot be magnetized, or such magnetization is minimal) and provided on the outer contact side of the flapper plate. In an exemplary embodiment, the flapper plate can per se remain magnetizable. For example, a non-magnetizable material may form the outside of the flapper plate, whereas at least a core area remains magnetizable and/or magnetizable particles are contained within non-magnetisable materials.

An electromagnetic solenoid valve according to an exemplary embodiment of the present disclosure is described with reference to FIGS. 1, 2, 5 and 6. The electromagnetic solenoid valve is generally designated with reference numeral 1.

In an exemplary embodiment, the electropneumatic solenoid valve 1 comprises a housing 3 with a lid 5 attached to the housing 3. On the attachment wall section 7 of the housing 3 opposite from the lid 5, two air channels are inserted into the housing structure, namely an air dispensing channel 11 and an air supply channel 13. Adjacent to the lid 5 a further air channel is worked into the housing structure 3 and indicated with reference numeral 15. This air channel is the air exhaust channel 15 which mounds uninhibited at the outside of the housing 3.

The three air channels 11, 13, 15 are pneumatically connected to an air chamber 17, which is at least in part limited by an inner wall section of the housing 3.

The air space 17 is cylindrical and additionally limited by a magnetic insert structure of an electromagnetic control device 21 to be detailed below. In the cylindrical air space 17, a plate-shaped flapper valve member 23 is movably float-mounted in a piston-like arrangement. The flapper valve member 23 comprises a plane flapper plate 25 of a magnetic (e.g., a magnetic soft material). The flapper plate 25 can comprises two plane plate surfaces, orthogonal to which the axial control direction S is arranged along which the electromagnetic control device 21 positions the flapper valve member 23.

The air supply channel 13 runs coaxially to the axial control direction S wherein the path of the air dispensing channel 11 in the attachment section 7 of the housing 3 also extends in the axial control direction S, however being arranged radially offset with respect to the air supply channel 13. As indicated above, both air channels 11, 13 mound into the air chamber 17.

In the central middle of particularly circular flapper plate 25, an orifice is provided into which a ball-shaped or spherical closure element 31 of a non-magnetic material such as ceramics is inserted and fastened (e.g., pressed in).

The spherical closure element 31 protrudes on both plate surfaces 27, 29 in the axial direction; on one side 27 on the radial height of the supply channel 13, facing same, and on the other side 29 on radial height of the mounding area of the air exhaust channel 15, the exhaust channel being inserted into a coil core 33 of the electromagnetic control device 21. The semi- or partially spherical protruding closure elements which project from the plane flapper plate 25, are dimensioned such that they can engage essentially air-tight in the corresponding end stop position in the mounding area of the respective air channel 13, 15, in order to prevent the venting of the electropneumatic solenoid valve 1 on the one hand (closed air exhaust channel 15) and on the other hand in order to avoid any further supply of pressurized pneumatic air from a source (not shown) of pressurized air via the supply line 13. Thereby, the axial maximal stroke H of the flapper valve member 23 is limited by the axial delimitation walls such that the opposingly projecting closure elements avoid any contact of the flapper plate 25 and the housing, because the respective closure element comes into engaging contact with the mounding edge of the respective air channels 13 or 15 first. An axial escape out of the contacting sphere of the mounding edge is excluded in all axial positions of the closure element which is in particular realized through the partially spherical shape of the closure element.

Figure 2:
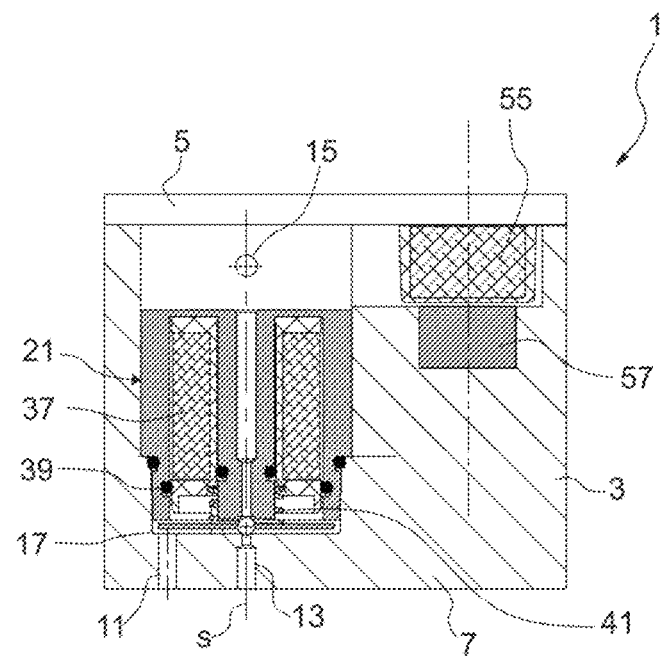
FIG. 2 illustrates a cross sectional view of the electropneumatic solenoid valve of FIG. 1 according to an exemplary embodiment in which the electromagnetic control device is deactivated and the biasing means (e.g., spring) pushes the flapper valve member to the opposite side wall including two air channels.

In an exemplary embodiment, the electromagnetic control device 21 (also referred to as an electromagnetic controller) comprises a coil 37 which surrounds the coil core 33 in circumferential direction. The coil 37 is attached to an electric operator source (e.g., via a control- or positioning-device) and receives electrical control signals to magnetically operate the magnetizable flapper plate 25 of the flapper valve member 23. In FIG. 1, the state of attraction is shown in which the coil 37 is activated and can be reached over the magnetic closure on the flapper valve member side-section of the magnetized coil core 33 and the coil coat 39 outwardly surrounding the coil 37. In FIG. 2, the inactive coil 37 is shown and the flapper valve member 23 is, due to the biasing means (e.g., spring), pushing against the mounding edge of the supply channel 13 to sealingly close it (FIG. 2).

In an exemplary embodiment, the flapper valve member 23 is float-mounted within the air chambers 17 such that the only forces acting upon the flapper valve member 23 are the selectively applied electromagnetic force of the control device (when activated), and the constant compression spring force of the spring 41 and the gravitation of the flapper valve member itself (depending upon the orientation of the solenoid valve relative to the directional gravity). In an exemplary embodiment, additional guiding for axially displacing the flapper valve member 23 in the axial control direction S is not necessary. The inventors have determined that an attachment of the spring coil engaging the flapper plate 25 may not be necessary to attach the spring coil to the flapper plate 25, and the pressure forces in conjunction with the electropneumatic forces of the control device suffice for ascertaining the positioning of the flapper valve member. In an exemplary embodiment, the flapper valve member is stationarily arranged in the respective end position (closing the air supply line of the supply channel 13/closure of the air exhaust channel 15) because the spherical closure element 33 self-centeringly fits itself into the mounding channel of the respective air channel. In an exemplary embodiment, on the way from one end position to the other air channel closing position, no further guidance is provided in order to axially position the control flapper valve member 23 within the air chamber.

In an exemplary embodiment, for operating the flapper valve member 23, an electromagnetic field is electromagnetically formed/generated to operate the flapper valve 23 depending upon the destination of the electromagnetic control device. Independent of the electromagnetic control device, the solenoid valve, in particular the axial movability of the flapper valve member, can easily be examined via an operation control mechanism, which may particularly be realized by an additional permanent magnet 55 which can be brought (e.g., pivoted) from a storage position into an examination position. The permanent magnet 55 is configured to bring the magnetizable components of the electromagnetic device into a magnetic field and to examine whether the flapper valve member 23 is thereby caused to be axially positioned. In an exemplary embodiment, supplying the electromagnet control device 21 with electrical energy is not necessary for the functional examination due to the additional application of the permanent magnet 55. The storage position of the permanent magnet 55 is shown in FIG. 1. The active examination condition is not shown in further detail in the figures. The permanent magnet 55 is arranged in the axial direction adjacently (above) relative to the electromagnetic control device 22.

In an exemplary embodiment, to define the permanent magnet 55 in the passive position (FIG. 1), it may be arranged opposite to a soft magnetic fixation element 57 so that the permanent magnet 55 is held in position under the influence of its magnetic force. In order to pivot the permanent magnet 55 into the active position which is not shown in detail, the holding forces must be overcome. In the examination position, in which the permanent magnet 55 is "activated or switched active," the permanent magnet 55 lies diametrically on the opposite side of the flapper plate 25 and acts upon it magnetically without mechanical contact. Thereby, it can be visually examined whether the flapper plate 25, depending on the position of the permanent magnet 55, closes the respective air channel 13, 15.

Figure 5:
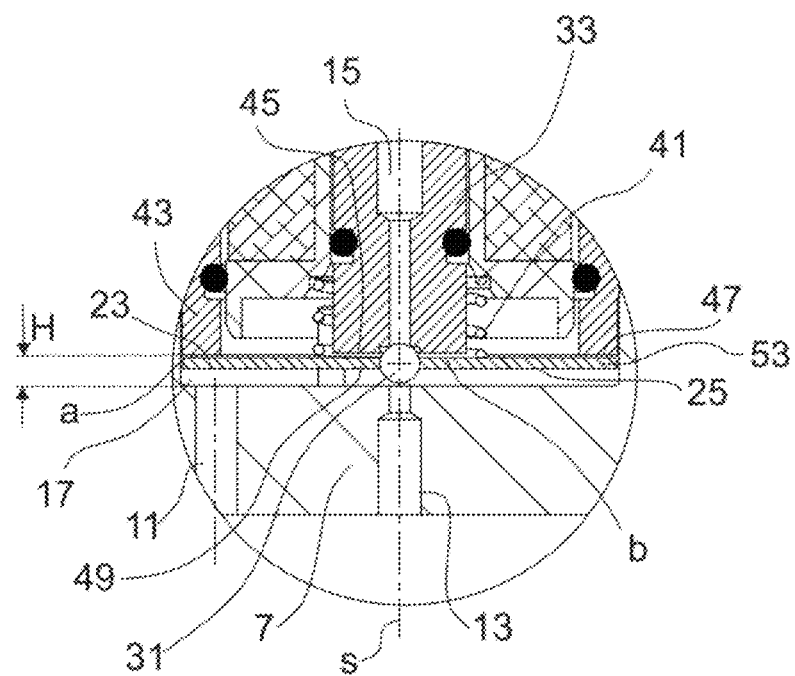
FIG. 5 illustrates a cross sectional view of the valve of FIGS. 1 and 2 according to an exemplary embodiment with the electromagnetic control device being activated.
Figure 6:
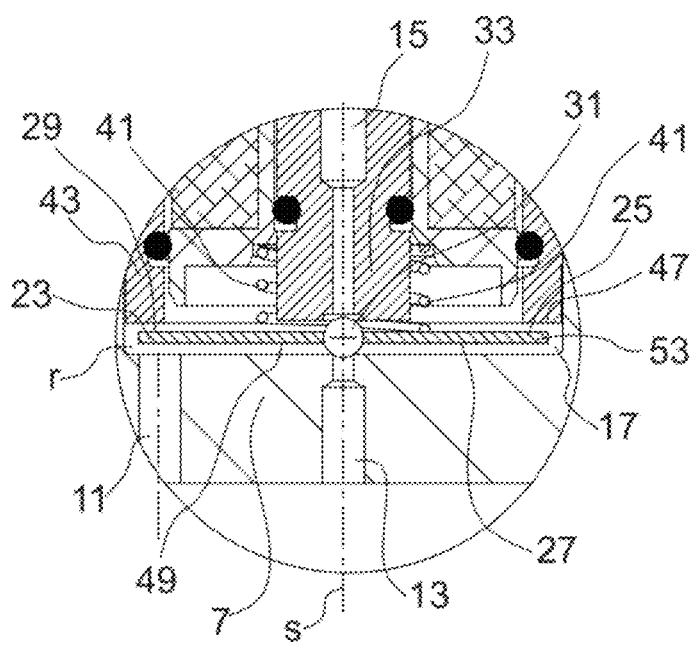
FIG. 6 illustrates the cross sectional view of FIG. 5 with the electromagnetic control device being deactivated.

As can be seen in FIGS. 5 and 6, in each position of the flapper valve member 23, an axial slot a and b opposite to the radial face area 45 of the coil core 33 or the face area 47 of the coil coat 43, respectively, is present in every position of the flapper valve member 23. Even in the near position of the flapper valve member 23 relative to the electromagnetic control device 21, a circumferential axial slot a, b exists between the front face side 45, 47 of the coil core 23 or the coil coat 43, respectively, and an inner end stop plate section 49 or an outer end stop plate section 53, respectively. In an exemplary embodiment, the end stop plate sections 49, 53 are not necessarily end stops occurring during normal operation, since the float-mounting is well balanced due to the prevailing forces, so that an engagement or touching is also adapted in view of the design of the closure element 41 and the respective corresponding sections of the air channels 13, 15, such that an end stop is not considered. Merely due to an extraordinary load, such as an impact load, a stopping engagement towards one of the plate sections occurs. This circumferential slot exists whenever the plate 25 of the flapper valve member 23 is arranged perpendicular relative to the control direction axis S.

As also illustrated in FIG. 5, which shows the state of the air tight sealing of the air exhaust channel 15, the circumferential axial distance a, which is constant in the entire circumferential direction, is slightly smaller than the axial distance b from the flapper plate 25 relative to the head surface 45 of the coil 33. This way, a tilting amplitude until a contacting engagement or end stop of the flapper plate onto the front face of the coil coat is kept relatively small so that a stable end position according to FIG. 5 is reached. In an exemplary embodiment, the axial slot a≤(smaller than or equal) half of the axial distance b. In an exemplary embodiment, the axial distance a shall not be formed larger than 0.1 mm, 0.2 mm, 0.3 mm or 1 mm.

In the operating position shown in FIG. 5, the air supply channel 13 is opened such that the air dispensing channel 11 is exerted to the pressure prevailing in the supply channel 13. In this state, the electromagnetic control device 21 is activated such that the electromagnetic attraction force from the coil core 33, the coil 37, and the coil coat 43 are larger than the pressure forces of the biasing springs 41.

During a gradual decrease of the electromagnetic force or a complete shut off of the electromagnetic device 21, the biasing spring takes over the operation of the flapper valve member 23 and pushes the latter against the inside of the attachment wall section 7 of the housing 3 whereby the proximal spherical closure element 31 engages against the mounding or mouth of the supply channel 13 in an air tight manner. This way, the air supply via the air channel 13 is prevented and the dispensing channel 11 is pneumatically connected to the exhaust channel 15 whereby the electro-pneumatic solenoid valve 1 is exhausted. It was shown that the position of the flapper plate 25 of the flapper valve member 23, due to the engagement of the spherical closure element 31 into the mounding of the air supply channel 13 in combination with the compression forces of the biasing spring 41, provides for a stable, air tight end position of the flapper valve plate.

Figure 3:
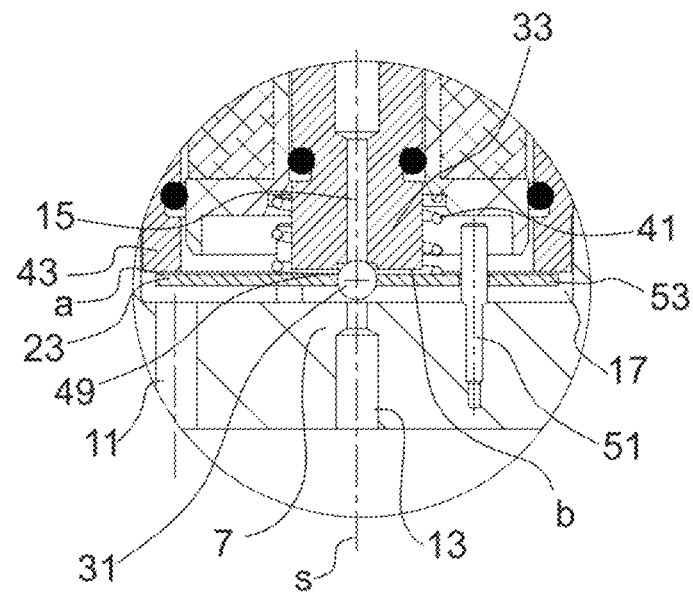
FIG. 3 illustrates a cross sectional view of a solenoid valve according to an exemplary embodiment of the present disclosure having an activated electromagnetic control device.
Figure 4:
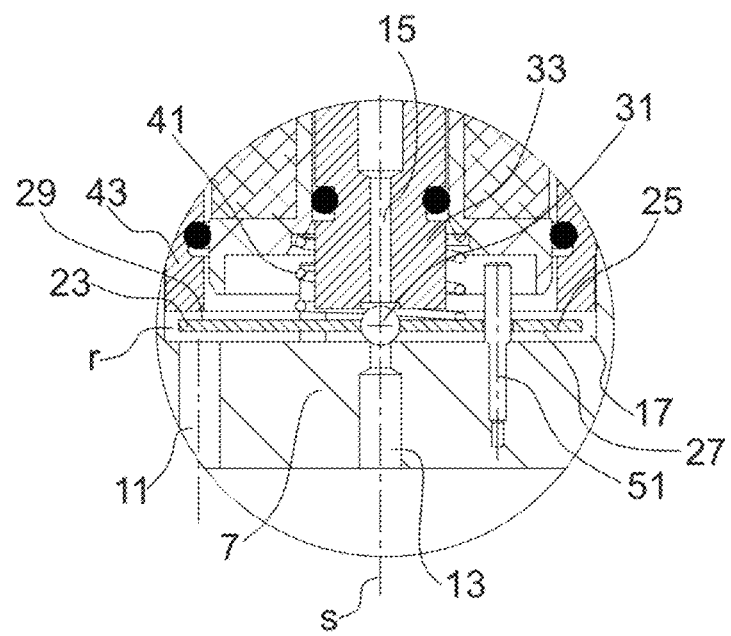
FIG. 4 illustrates the cross sectional view of the valve of FIG. 3 with the electromagnetic control device being deactivated.

In an exemplary embodiment, as shown in FIGS. 3 and 4, an additional guiding pin 51 is attached to the attachment section 7 and protrudes in the air chamber 17. This guiding pin 51 serves predominantly not for guiding the flapper valve member 23 during normal operation moving the flapper valve member to and from the axial control direction S. Rather, by utilizing the pin, an axial guide 51 shall be provided such that the radial position of the flapper valve member is secured in order to avoid a faulty arrangement of a flapper valve member 23, in case of impulse-like overload-movements onto the solenoid valve, for example during transport or mounting is avoided. Of course these guiding pins 51 can be omitted, even when the radial distance r between the circular and annular outer end of the plate 25 of the flapper plate member 23 and the opposing cylindrical inner wall side of the housing 3 of the air chamber 17 allows only a slight radial movement.

In an exemplary embodiment, the present disclosure is not limited to singular pin configurations, and multiple pins could also be provided without providing a guiding function. Through the lack of contact or freedom from contact of the guiding pins in the openings through the plate 25 of the flapper valve member 23, friction and thereby friction losses between the flapper valve member and the guiding pins are excluded. The pins can preferably be dispensed with.

In an exemplary embodiment, a radial distance or slot r is smaller than 2 mm. In an exemplary embodiment, the radial distance or slot r is less than, for example, 1 mm, 0.5 mm or 0.2 mm, but is not limited thereto.

In an exemplary embodiment, the flapper valve member 23 shown in the figures is made of a magnetic soft material (e.g. metal), including, for example, ferrite, to easier receive attraction forces through the electromagnetic control device. Is has also been shown with metallic flapper valve members, in particular flapper plates 25, that even in case of de-energizing the coil 37 of the electromagnetic control device 21, residual magnetic forces act, which cause an adhesion of the flapper valve member 25 to the metal components of the non-electrified control device. According to the disclosure, the magnetic flapper valve member may be provided with a coating of a non-magnetic material, such as Teflon, which avoids such as adhesion. In combination with the axial slots or axial distances a/b, it is achieved in combination with a non-magnetic coating (e.g. a Teflon layer), that a magnetic adhesion to the coil core 33 or the coil coat 43 can be excluded. In an exemplary embodiment, the flapper plate 25 can also be realized by a non-metallic material, such as a polymer material and/or plastic material, which may be provided with metallic particles for receiving attraction forces. In case of such a polymer flapper valve member embodiment, a non-magnetic coating can be omitted in one or more embodiments.

In an exemplary embodiment, as shown in FIGS. 3 to 6, the air chamber is realized more or less as a cylindrical slot with an axial depth a bit more. The axial depth can be, for example, threefold or fourfold smaller than the fivefold of the axial strength of the plate 25 of the flapper valve member 23. In this way, also wedging of the float-mounted flapper valve member 23 is impaired, particularly during mounting and transporting.

In an exemplary embodiment, the radial stops inside of the housing 3 and the axial end stops (e.g. the coil coat 43 and the coil core 33), the face sides thereof, as well as the opposite radially extending interior wall sections, do not serve for guiding the flapper valve member.

In an exemplary embodiment, the solenoid valve according to the disclosure can be utilized for operation in a position controller and in combination with pneumatic actuators which may be single or double action.

The features disclosed in the above description, the figures and the claims can be of relevance for the realization of the disclosure in the different embodiments thereof both individually as well as in any arbitrary combination thereof.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 pneumatic solenoid valve
3 housing
5 lid
7 attachment wall section
11 air dispensing channel
13 air supply channel
15 air exhaust channel
17 air space
21 electromagnetic control device (or electromagnetic controller)
23 plate-shaped flapper valve member
25 flapper plate
27, 29 plate surfaces
31 closure element
33 coil core
37 coil
41 spring
43 coil coat
45, 47 face area
49 inner end stop plate section
51 guiding pin
53 outer end stop plate section
55 permanent magnet
57 fixing element
S axial control direction
a axial slot
b axial space
H movement amplitude/maximum stroke

What is claimed is:

1. A pneumatically actuated field device of a processing plant having a pressurized air source and a pneumatic positioning drive, the pneumatically actuated field device comprising:
   an electropneumatic solenoid valve including:
      an air supply channel configured to connect to the pressurized air source, an air dispensing channel configured to connect to the pneumatic position drive, and an air exhaust channel, wherein the air supply channel, the air dispensing air channel, and the air exhaust channel communicate with an air chamber;
      a flapper valve member including a closure element arranged in an axial control direction, the closure element being formed of ceramics and as a circular ball, wherein the closure element is engageable with a mouth of a delimitation interior wall of one of the air supply channel and the air exhaust channel such that the flapper valve member is arranged with a circumferential axial distance, with respect to the axial control direction, to the delimitation interior wall;
      an electromagnetic controller configured to displace the flapper valve member in the axial control direction to ventilate or exhaust the air dispensing channel; and
      a spring configured to bias the flapper valve member into a closed position to close the one of the air supply channel and the air exhaust channel, wherein the flapper valve member is float-mounted in an unguided configuration within the air chamber,
      wherein the flapper valve member further includes a magnetizable flapper plate having at least one closure side to be arranged facing at least one of the air supply channel and the air exhaust channel to be closed or to be released, and being engageable with an axial contact wall of the air chamber to be magnetized by the electromagnetic controller of the solenoid valve, in which at least one the air supply channel and an air exhaust channel is formed, and at each closing position of the magnetizable flapper plate, the magnetizable flapper plate maintains a circumferential axial distance to the delimitation interior wall, wherein: the at least one closure side is at least surface-sectionally formed with a non-magnetizable cover material including a Teflon layer, or the magnetizable flapper plate is a non-metallic material provided with metallic particles having magnetic properties.

2. The pneumatically actuated field device according to claim 1, wherein the circular ball projects from the magnetizable flapper plate of the flapper valve member.

3. The pneumatically actuated field device according to claim 2, wherein the closure element has at least a spherical convex shape.

4. The pneumatically actuated field device according to claim 2, wherein:
   the magnetizable flapper plate is a circular flapper plate; and the closure element includes a non-magnetic material and the circular ball is inserted into the magnetizable flapper plate.

5. The pneumatically actuated field device according to claim 1, wherein the flapper valve member comprises: two plane plate surfaces opposite from one another.

6. The pneumatically actuated field device according to claim 1, wherein the flapper valve member comprises:
at least two annularly surrounding plate sections each having constant plate thickness, the at least two annularly surrounding plate sections are arranged offset from one another in the axial control direction.

7. The pneumatically actuated field device according to claim 1, wherein the flapper valve member comprises a radially inwardly arranged interior end stop section diametrically opposite from a coil core of the electromagnetic controller in the axial control direction and an exterior end stop section radially outwardly surrounding the interior end stop section, the exterior end stop section being arranged diametrically opposite a coil coat in the axial control direction and radially outwardly surrounding a coil of the electromagnetic controller or being arranged diametrically opposite to a housing section of the electromagnetic solenoid valve in the axial control direction, wherein at least one of the air supply channel, the air dispensing air channel, and the air exhaust channel is formed within the coil core.

8. The pneumatically actuated field device according to claim 7, wherein:
the flapper valve member and the corresponding end stop sections are configured such that, when the at least one of the air supply channel, the air dispensing air channel, and the air exhaust channel formed within the coil core is occupied by the closed closure member, a radially outer axial distance from the flapper valve member to the exterior end stop section is smaller than a radially inner axial distance from the flapper valve member to the interior end stop section, and
wherein the radially inner axial distance, during occupation of the at least one of the air supply channel, the air dispensing air channel, and the air exhaust channel formed within the coil core by the closure element is smaller than 1.0 mm, 0.5 mm, 0.3 mm or 0.1 mm and/or the radially outer axial distance is dimensioned smaller than the radially inner axial distance by one half.

9. The pneumatically actuated field device according to claim 8, wherein:
a second one of the air supply channel, the air dispensing air channel, and the air exhaust channel communicates with the solenoid valve housing of the solenoid valve coaxially to the at least one of the air supply channel, the air dispensing air channel, and the air exhaust channel formed within the coil core such that a rear side of the closure member closes the air supply channel in solenoid valve housing axially opposite from the air exhaust channel formed within the coil core under influence of the spring after a corresponding axial displacement of the flapper valve member, wherein a front side of the closure member closes the air channel in the coil core; and
a third one of the air supply channel, the air dispensing air channel, and the air exhaust channel is formed radially offset to the second one of the air supply channel, the air dispensing air channel, and the air exhaust channel that communicates with the solenoid valve housing, the third one of the air supply channel, the air dispensing air channel, and the air exhaust channel that communicates with the solenoid valve housing being non-closable by the closure member in any axial control position thereof.

10. The pneumatically actuated field device according to claim 7, wherein:
a second one of the air supply channel, the air dispensing air channel, and the air exhaust channel communicates with the solenoid valve housing of the solenoid valve coaxially to the at least one of the air supply channel, the air dispensing air channel, and the air exhaust channel formed within the coil core such that a rear side of the closure member closes the air supply channel in solenoid valve housing axially opposite from the air exhaust channel formed within the coil core under influence of the spring after a corresponding axial displacement of the flapper valve member, wherein a front side of the closure member closes the air exhaust channel in the coil core; and
a third one of the air supply channel, the air dispensing air channel, and the air exhaust channel is formed radially offset to the second one of the air supply channel, the air dispensing air channel, and the air exhaust channel that communicates with the solenoid valve housing, the third one of the air supply channel, the air dispensing air channel, and the air exhaust channel that communicates with the solenoid valve housing being non-closable by the closure member in any axial control position thereof.

11. The pneumatically actuated field device according to claim 1, wherein:
the air chamber is radially delimited by a cylindrical chamber interior wall, wherein the magnetizable flapper plate of the flapper valve member is circular and is float-mounted and axially moveable within the air chamber, the magnetizable flapper plate being exclusively guided by the spring;
a maximal axial amplitude of movement of the flapper valve member in the axial control direction is at most one quarter of the axial thickness of the magnetizable flapper plate; and
the thickness of the magnetizable flapper plate is between 0.6 mm and 1 mm and/or a maximal stroke is 0.1 mm to 0.3 mm.

12. The pneumatically actuated field device according to claim 1, wherein:
the flapper valve member and at least two seat bores cooperating with the flapper valve member, the at least two seat-bores being arranged opposite one another, and
a maximal stroke of the flapper valve member is configured such that the closure element is held in an area of one of the at least two seat bores and centers itself in the middle of the one of the at least two seat bores upon closing.

13. The pneumatically actuated field device according to claim 1, wherein the pneumatically actuated field device is a positioner of a processing plant.

14. The pneumatically actuated field device according to claim 13, wherein the processing plant is a chemical plant, a petrochemical plant, a food processing plant, a brewery, or a power plant.

15. The pneumatically actuated field device according to claim 1, wherein the non-metallic material of the magnetizable flapper plate is a polymer material or a plastic material.

* * * * *